US008001540B2

(12) United States Patent
Bendert et al.

(10) Patent No.: US 8,001,540 B2
(45) Date of Patent: Aug. 16, 2011

(54) SYSTEM, METHOD AND PROGRAM PRODUCT FOR CONTROL OF SEQUENCING OF DATA PROCESSING BY DIFFERENT PROGRAMS

(75) Inventors: Edward J. Bendert, Vestal, NY (US); Melissa K. Howland, Endicott, NY (US); Steven Shultz, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1400 days.

(21) Appl. No.: 11/501,439

(22) Filed: Aug. 8, 2006

(65) Prior Publication Data

US 2008/0177993 A1 Jul. 24, 2008

(51) Int. Cl.
G06F 9/45 (2006.01)
G06F 9/44 (2006.01)

(52) U.S. Cl. ........ 717/159; 717/140; 717/151; 717/156; 712/43; 712/245

(58) Field of Classification Search .................. None
See application file for complete search history.

(56) References Cited

U.S. PATENT DOCUMENTS

| | | | |
|---|---|---|---|
| 6,170,045 B1 | 1/2001 | Bobak et al. ................. 711/169 |
| 6,389,482 B1 | 5/2002 | Bobak et al. ................. 709/312 |
| 6,397,379 B1 * | 5/2002 | Yates et al. .................... 717/140 |
| 7,111,290 B1 * | 9/2006 | Yates et al. .................... 717/158 |
| 7,137,111 B2 * | 11/2006 | Damron et al. ............... 717/159 |
| 7,219,342 B2 * | 5/2007 | Metzgen ........................ 717/156 |
| 7,356,673 B2 * | 4/2008 | Altman et al. .................. 712/43 |
| 7,401,328 B2 * | 7/2008 | Lu .................................. 717/159 |
| 2003/0037178 A1 | 2/2003 | Vessey et al. .................. 709/319 |
| 2003/0101443 A1 * | 5/2003 | Kosche et al. ................ 717/158 |
| 2004/0083481 A1 | 4/2004 | Shultz et al. ................... 719/312 |
| 2004/0111594 A1 * | 6/2004 | Feiste et al. .................... 712/245 |
| 2004/0221285 A1 | 11/2004 | Donovan et al. ................. 718/1 |
| 2004/0221290 A1 | 11/2004 | Casey et al. ................... 718/104 |
| 2004/0230972 A1 | 11/2004 | Donovan et al. .................. 718/1 |
| 2005/0114850 A1 * | 5/2005 | Chheda et al. ................ 717/151 |
| 2005/0223005 A1 | 10/2005 | Shultz et al. ...................... 707/8 |

FOREIGN PATENT DOCUMENTS

| | | |
|---|---|---|
| JP | 63-036445 | 2/1988 |
| JP | 07-013823 | 1/1995 |
| JP | 2002-073358 | 3/2002 |
| WO | WO 00/73902 A1 | 12/2000 |

OTHER PUBLICATIONS

"CMS Pipelines User's Guide", Version 5 Release 1.0, IBM, Sep. 2004, 351 pages, <http://publibz.boulder.ibm.com/cgi-bin/bookmgr_OS390/DOWNLOAD/hcsh1b00.pdf>.*

Sine Nomine Associates, "Pipelines Overview", http://www.sinenomine.net/node/104, pp. 1-5 (Jun. 16, 2006).

* cited by examiner

Primary Examiner — Thuy Dao
(74) Attorney, Agent, or Firm — Dennis Jung (57) ABSTRACT

Generally, piping applications defined by combining stages of programming with a sequence control program and specifying to the sequence control program piping commands. The stages may be functions to send data to a shared queue. The piping commands identify current stages, and parameters for the current stages identify the queue and a key for the data to be sent to the queue. The piping commands do not identify preceding and/or subsequent piping applications.

12 Claims, 7 Drawing Sheets

SYSTEM, METHOD AND PROGRAM PRODUCT FOR CONTROL OF SEQUENCING OF DATA PROCESSING BY DIFFERENT PROGRAMS

FIELD OF THE INVENTION

The present invention relates generally to computer systems, and more specifically to control of sequencing of data processing by different programs.

BACKGROUND OF THE INVENTION

The Unix (tm licensed by X/Open Company, LTD) operating system and Linux operating system currently offer a Pipes control program to control sequencing of data processing by different applications. A programmer provides to the Pipes control interpreter program, various program stages (or program functions) and a Pipes command to control sequencing of data between the sages. The Pipes command indicates which stage is entitled to request the output of another, specified stage. For example, a user can provide to the Pipes control program, stages A, B and C and issue the following Pipes command: "Stage A/Stage B/Stage C". In response, the Pipes control program will form a Pipes application program. According to this Pipes application program, Stage A will generate output data and automatically send it to the Pipes control program. Upon request by Stage B to the Pipes control program, the Pipes control program will furnish to Stage B the output data from Stage A. Stage B will process the output data from Stage A, and automatically send its output data to the Pipes control program. Upon request by Stage C to the Pipes control program for data, the Pipes control program will furnish the output data from Stage B to Stage C. The format for the Pipes command and the interface between each stage and the Pipes control function is based on a predefined protocol. According to the Pipes control function protocol, each stage in the "Pipe" is ignorant of which other stage is the source or recipient of its data, and does not synchronize the data with the prior or subsequent stages. To synchronize the data means to coordinate access to and processing of the data. This simplifies programming of the stages and definition of the Pipes applications by the users. In Unix and Linux Pipes control programs, each stage in the Pipe can receive data from only one stage and can provide data to only one stage, i.e. "single-streaming". Also, a Unix or Linux Pipes Application is limited to stages and control programs executing in the same real computer.

International Business Machines Corporation has licensed an IBM z/VM operating system to provide a Virtual Machine environment in a real computer. To form a Virtual Machine environment, a base operating system (called "Control Program" or "CP" in IBM Virtual Machine operating systems) logically divides the physical resources (i.e. processor time, memory, etc.) of a real computer into different functional units. Each functional unit or "virtual machine" typically has all the physical resources to execute its own operating system (such as IBM VM/CMS operating systems, Linux (tm of Linus Torvalds) operating system or z/OS operating systems) and applications. Applications, guest operating systems and other programs execute in each virtual machine as if the programs were executing in separate real computers. In these respects, a virtual machine is similar to a logical partition or "LPAR", which is another known technique to logically divide the physical resources of a computer into different functional units.

The IBM z/VM operating system provides a Pipeline control program in the IBM VM/CMS guest operating system, and IBM z/OS operating system provides a similar Pipeworks control program in its guest operating system. A user provides program stages to each control program and a Pipeline command or Pipeworks command, which is similar to the Pipes command. The known Pipeline control function and Pipeworks control function control sequencing of data between stages, according to the Pipeline or Pipeworks command. The Pipeline or Pipeworks command indicates which stage is entitled to request the output of another, specified stage. For example, a user can provide to the Pipeline control program, Stages A, B and C and issue a Stage A/Stage B/Stage C command. In response, the Pipeline control program will form a Pipeline application program. According to this Pipeline application program, Stage A will generate output data and send it to the Pipeline control program. Upon request by Stage B to the Pipeline control program, the Pipeline control program will furnish to Stage B the output data from stage A. Stage B will process this output data from Stage A, and automatically send its output data to the Pipeline control program. Upon request by Stage C to the Pipeline control program for data, the Pipeline control program will furnish the output data Stage B to Stage C. The format for the Pipeline command and the interface between each stage and the Pipeline control function are based on a predefined protocol. According to the Pipeline control function protocol, each stage in the Pipeline is ignorant of which other stage is the source or recipient of its data, and does not synchronize the data with the prior or subsequent stages. This simplifies programming of the stages and definition of the Pipeline command. A Pipeline or Pipeworks application is limited to stages and control programs executing in the same virtual machine or real computer.

In many respects, the Pipeline and Pipeworks control programs are similar to the Pipes control program. However, as noted above, the Pipes control program only supports "single-streaming", whereas the Pipeline and Pipeworks control programs support "single-streaming" and "multi-streaming". In multi-streaming, a Pipeline stage or Pipeworks stage can receive data from one or more other stages and can provide data to one or more other stages. Often times, different units of output from one stage are provided as input to more than one other stage in the "multi-streaming" arrangement so that the other stages can process the output from the one stage in parallel. To implement multi-streaming output, the Pipeline control program provides special purpose stages that can either take multiple streams and convert them into one stream ("fan-in") or take one stream and convert it into multiple streams ("fan-out"). This allows pipeline applications to be much more flexible than traditional pipes applications, thus enabling pipeline applications to perform a much wider set of tasks. An example of a Pipeline command for a multi-streaming output is as follows:

---

Pipe (endchar ?)

Literal "George Washington" /* define some data */
| a: fanout /*output data to multiple streams */
| > USA Presidents /* write output on first stream to a file */
? /* end of first stream */
| a: /* start second stream */
| > Bad Golfers/* write output on second stream to a different file */

An example of a Pipeline command for a multi-streaming input is as follows:

| Pipe (enchar ?) |
| --- |
| Literal "George Washington" /* define data for first stream */ |
| \| A: fanin /* input data from multiple streams */ |
| \| > USA Presidents_/* output data to a file */ |
| ? /* end of first stream */ |
| Literal "John Adams" /* define data for second stream */ |
| A: /* output second stream data to fanin stage */ |

Parallel processing was also known in non-piping environments. For example, an application has been divided into multiple parts to be run on multiple computers, where communications between the computers are used to synchronize the processing done by such a multi-part program. The purpose of such an arrangement was to provide parallel processing of independent parts of the program where the sequential execution of those parts would not provide sufficient throughput. Such a program is complex because it is difficult to determine exactly which parts of the program are independent and which parts require synchronization. In addition, managing the multiple parts and implementing the required synchronization is also difficult.

It was known in a nonpiping environment to provide shared files in a shared memory accessible by different applications in different virtual machines in the same or different real computer. The nonpiping applications in the different virtual machines can write data to the shared memory without identifying an authorized reader(s) of the data from the shared memory. The nonpiping applications in the different virtual machines can read data from the shared memory without identifying an authorized writer(s) of the data to the shared memory. It was known that these nonpiping applications could process in parallel the data read from the queue, and return resultant data to the queue. It was also known in a nonpiping environment to serialize access to the data in the shared memory by providing a shared queue in the shared memory. It was also known in a nonpiping environment to synchronize access to the data in the shared memory by a shared lock structure.

An object of the present invention is to improve the versatility of a Pipes control program, Pipeline control program, Pipeworks control program and other such piping control programs.

SUMMARY OF THE INVENTION

The present invention resides in a computer system, method and program product for processing data by first, second and third piping applications. A first piping application is defined by combining first and second stages of programming with a first sequence control program and specifying to the first sequence control program a first piping command. The second stage is a function to send data to a shared queue. The first piping command identifies the first stage, the second stage and parameters for the second stage identifying the queue and a key for the data to be sent to the queue. A second piping application is defined by combining third and fourth stages of programming with a second sequence control program, and specifying to the second sequence control program a second piping command. The third stage is a function to read the data from the queue. The second piping command identifies the fourth stage, the third stage, and parameters for the third stage identifying the queue and the key for the data to be read from the queue. A third piping application is defined by combining fifth and sixth stages of programming with the second sequence control program, and specifying to the second sequence control program a third piping command. The fifth stage is a function to read the data from the queue. The third piping command identifies the sixth stage, the fifth stage and parameters for the fifth stage identifying the queue and the key for the data to be read from the queue. The first, second and third piping applications are executed based on their respective definitions, stages and sequence control programs. The first piping command does not identify the second or third piping applications. The second piping command does not identify the first or third piping applications. The third piping command does not identify the first or second piping applications.

According to features of the invention, the first stage receives and processes data from the first sequence control program and sends resultant, first stage output data to the first sequence control program. The second stage receives the first stage output data from the first sequence control program and sends the first stage output data to the queue with the key. The third stage receives and processes from the queue some of the first stage output data sent by the second stage to the queue and sends resultant, third stage output data to the second sequence control program. The fourth stage receives and processes the third stage output data from the second sequence control program and sends resultant, fourth stage output data to the second sequence control program. The fifth stage receives and processes from the queue other of the first stage output data sent by the second stage to the queue and sends resultant, fifth stage output data to the second sequence control program. The sixth stage receives and processes the fifth stage output data from the second sequence control program and sends resultant, sixth stage output data to the second control program.

According to other features of the present invention, the first piping application does not identify the second piping application or the third piping application. The second piping application does not identify the first piping application or the third piping application. The third piping application does not identify the first piping application or the second piping application.

According to other features of the present invention, the first piping application executes in a first real computer, and the second and third piping applications execute in a second real computer.

DETAILED DESCRIPTION OF THE PREFERRED EMBODIMENTS

Figure 1:
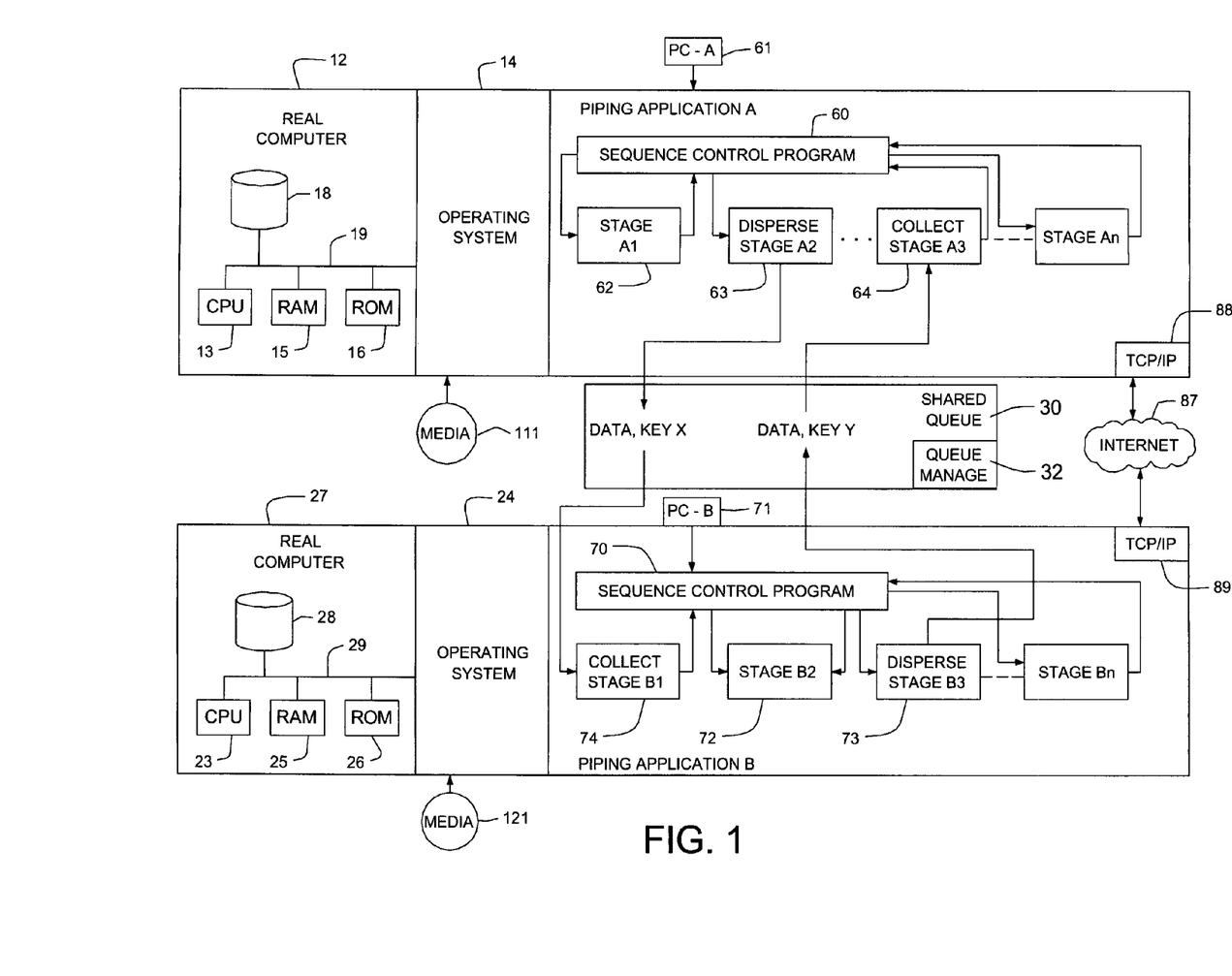
FIG. 1 is a block diagram of a distributed computer system which includes one Piping Application based on one sequence control program and one set of stages in one computer and another Piping application based on another sequence control program and another set of stages in another computer, according to the present invention.

The present invention will now be described in detail with reference to the figures. FIG. 1 illustrates a distributed computer system generally designated 10 according to the present invention. System 10 comprises a real computer 12 with a known processor 13, operating system 14, RAM 15 and ROM 16 on a common bus 17, and storage 18. System 10 also comprises another real computer 22 with a known processor 23, operating system 24, RAM 25 and ROM 26 on a common bus 27, and storage 28. Operating system 14 can be any of a variety of known operating systems such as Unix, Linux, Microsoft Windows, IBM z/VM, or IBM z/OS operating system. Likewise, operating system 24 can be any of a variety of known operating systems such as Unix, Linux, Microsoft Windows, IBM z/VM system, or IBM z/OS operating system, and can be the same or different than operating system 12. System 10 also includes a shared queue 30 and shared queue manager 32. Shared queue 30 can be in a shared or non shared memory of computer 12, computer 22, in another computer (not shown) or in disk storage.

Computer 12 also includes a sequence control program 60 and program stages A1, A2, A3, A4 . . . An which form a Piping Application A based on a piping command PC-A 61, according to the present invention. The piping command PC-A 61 specifies each stage in Piping Application A and the sequence of the stages. The sequence of the stages indicates the flow of data from one stage to the next. In the illustrated example, Stage A2 is a "disperse" stage, which is a program function which receives data or records from sequence control program or interpreter 60 and sends it to queue 30. In the case of the "disperse" stage, the piping command also includes the identity of the queue to receive the data or records to be dispersed and a key to identify this data and distinguish it from other data on the same queue. In the illustrated example, Stage A3 is a "collect" stage, which is a program function which receives data or records from queue 30 and sends it to sequence control program 60. In the case of the "collect" stage, the piping command indicates the identity of the queue from which to fetch the data and a key to identify this data and distinguish it from other data on the sane queue. The control program 60 implements the piping command by invoking each stage in the specified sequence, receiving the output data from each stage and furnishing the output data from each stage to the next stage in the sequence. In the illustrated example, stage A1 provides some function which generates a data or record output and supplies it to control program 60. Stage A1 does not indicate or know the next stage in the sequence. As noted above, Stage A2 is a function which receives the output data from Stage A1 via control program 60 and disperse this output data from stage A1 to a shared queue 30 (without modification). However, Stage A2 does not indicate or know of Stage A1; rather, Stage A2 merely requests data, and control program 60 is programmed to provide the output data from Stage A1. Stage A3 provides a function to collect other data from shared queue 30 and furnish the collected data to stage A4 via control program 60. However, Stage A3 does not indicate or know the original source of the data to be collected from queue 30, except that is will reside in the queue 30. Also, Stage A3 does not indicate or know that Stage A4 will receive this data from control program 60; rather, Stage A3 automatically sends the data to control program 60. Stage A4 does not indicate or know Stage A3; rather, Stage A4 merely requests data from control program 60, and control program 60 is programmed to provide the data output from Stage A3 to Stage A4 upon request by Stage A4. Stage A4 provides some function which generates a data or record output based on the data from stage A3 and furnish the result to control program 60. Piping Application A can include other, subsequent stages. All stages in Application A read their input from and send their output to control program 70, except the disperse stage which outputs its data to the queue 30 and the collect function which reads its data from the queue 30. The overall function of Application A is not important to the present invention, and could be a system management function, resource management function or communication application as examples.

Computer 22 also includes a sequence control program or interpreter 70 (which is similar to sequence control program or interpreter 60) and program stages B1, B2, B3 . . . Bn which form a resultant Piping Application B based on a piping command PC-B 71, according to the present invention. The piping command PC-B 71 specifies each stage in Piping Application B and the sequence of the stages. The sequence of the stages indicates the flow of data from one stage to the next. In the illustrated example, Stage B1 is a "collect" stage, which is a program function which receives data or records from queue 30 and sends it to sequence control program 70. In the case of the "collect" stage, the piping command indicates the identity of the queue from which to fetch the data and a key to identify this data and distinguish it from other data on the sane queue. In the illustrated example, Stage B3 is a "disperse" stage, which is a program function which receives data or records from sequence control program 70 and sends it to queue 30. In the case of the "disperse" stage, the piping command also includes the identity of the queue to receive data to be dispersed and a key to identify this data and distinguish it from other data on the same queue. The control program 70 implements the piping command by invoking each stage in the specified sequence, receiving the output data from each stage and furnishing the output data from each stage to the next stage in the sequence. In the illustrated example, Stage B1 collects from the shared queue 30 the data sent by disperse Stage A2 of Piping Application A and furnishes this data to Stage B2 via control program 70. However, Stage B1 does not indicate or know the original source of the data to be collected, except that is will reside in the queue 30 (and the key for the data to be collected). Also, Stage B1 does not indicate or know that Stage B2 will receive the data from control program 60; rather, Stage B1 automatically sends the data it collects to control program 70. Stage B2 provides some function which generates a data or record output to control program 70 based on the data collected by Stage B1 from the queue. Stage B2 does not know or indicate that Stage B3 will read and process this data from the control program 70. Stage B3 receives the data or record output from stage B2 via control program 70 and disperses the data or record output from stage B2 to shared queue 30 where it is available to collect Stage A3 of Piping Application A. Stage B3 does not know or indicate the stage that generated the data that it receives from control program 70 and disperses to the queue, and does not know the stage that will fetch and process the data that it sends to queue 30. Stage B3 does not know or indicate that Piping Application A will fetch and process the data that Stage B3 writes to queue 30. Piping Application B can include other stages such as the foregoing. All stages in Application B read their input from and send their output to control program 70, except the disperse stage B3 outputs its data to the queue 30 and the collect Stage B1 reads its data from the queue 30. The overall function of Application B is not important to the present invention, and could be a system management function, resource management function or communication application as examples.

Figure 2A:
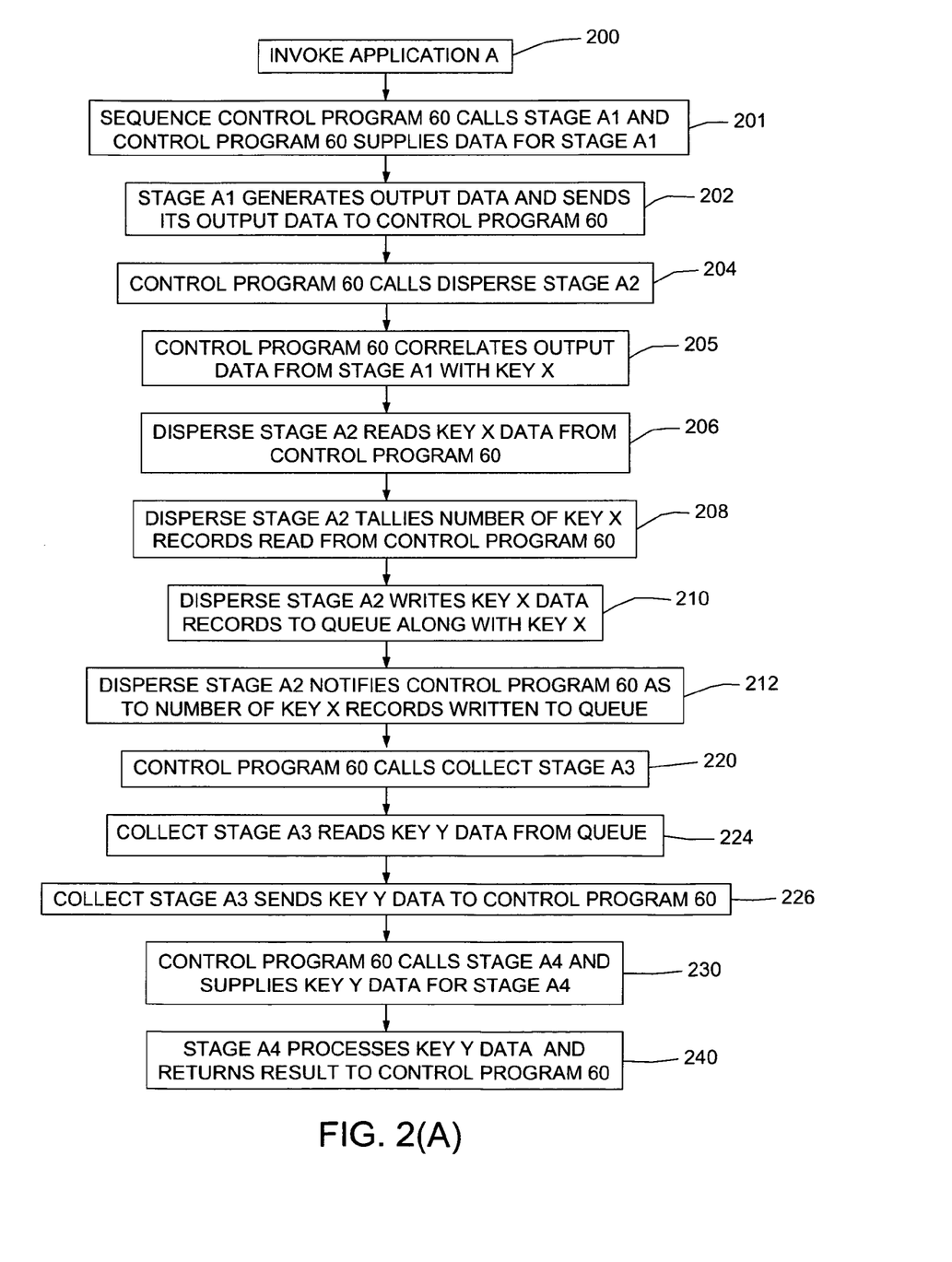
FIG. 2(A) is a flow chart illustrating in more detail the one Piping application in the one computer of FIG. 1.

FIG. 2(A) is a flowchart illustrating processing by Piping Application A including sequence control program 60 and stages A1-A4 for the example illustrated in FIG. 1. In this example, the developer of Application A previously supplied and combined Stages A1-A4 with the sequence control program 60 and previously issued the following command to sequence control program 60 to form Application A:

Stage A1|Disperse(Queue 30, Key X)|Collect(Queue 30, Key Y, T1)|Stage A4

In step 200, Application A is invoked, and in response, sequence control program 60 calls the first stage, Stage A1 62, in Application A (step 201). Control program 60 calls Stage A1 with the following command (which identifies Stage A1):

"Stage A1" (with parameters when needed)

If control program 60 has data for Stage A1, then control program 60 supplies such data to Stage A1 in step 201. After Stage A1 executes (and processes data, if any, supplied by control program 60), Stage A1 generates a data or record output which Stage A automatically supplies to control program 60 (step 202). Next, sequence control program 60 calls its second stage, Stage A2 63, in Application A (step 204). In the illustrated example, Stage A2 is a disperse stage, and control program 60 calls the disperse stage with the following command:

"Disperse(Queue 30, Key X)"

Sequence control program 60 also correlates this first stage output data with Key X (step 205). In response to the disperse command, the disperse stage A2 reads first output stage data identified by Key X from sequence control program 60 (step 206), tallies the total number of records received from control program 60 (step 208), and then "disperses" or writes the first stage output data or records onto the shared queue 30 along with Key X (step 210). Disperse stage 63 also supplies to the control program 60 the total number of records received from control program 60 and written to queue 30 (step 212). Another program stage can use this tally of records to ensure that it has collected responses for all the records. After completion of disperse stage A2 63, control program 60 calls the next stage A3 64, which in the illustrated example is a collect stage (step 220). Control program 60 calls the collect stage A3 with the following command:

"Collect(Queue 30, Key Y, T1)"

This collect command directs collect stage A3 64 to read from queue 30 data identified by Key Y until all records have been read or a time-out of "T1" seconds is reached. In response, collect stage A2 64 attempts to read such data from queue 30 (step 224). If such data is currently resident on queue 30, collect stage A2 64 will send it to control program 60 (step 226). Next, control program 60 continues by invoking the next stage in Application A, which in the illustrated example is stage A4, with the following command (step 230):

"Stage A4" (with parameters when needed)

With this call, control program 60 will supply the data with Key Y fetched by collect Stage A3 from queue 30. In response, stage A4 will process this data (step 240), and return the results to control program 60 (unless stage A4 is a disperse stage). If there are any other stages in Application A, then control program 60 invokes them in sequence.

Figure 2B:
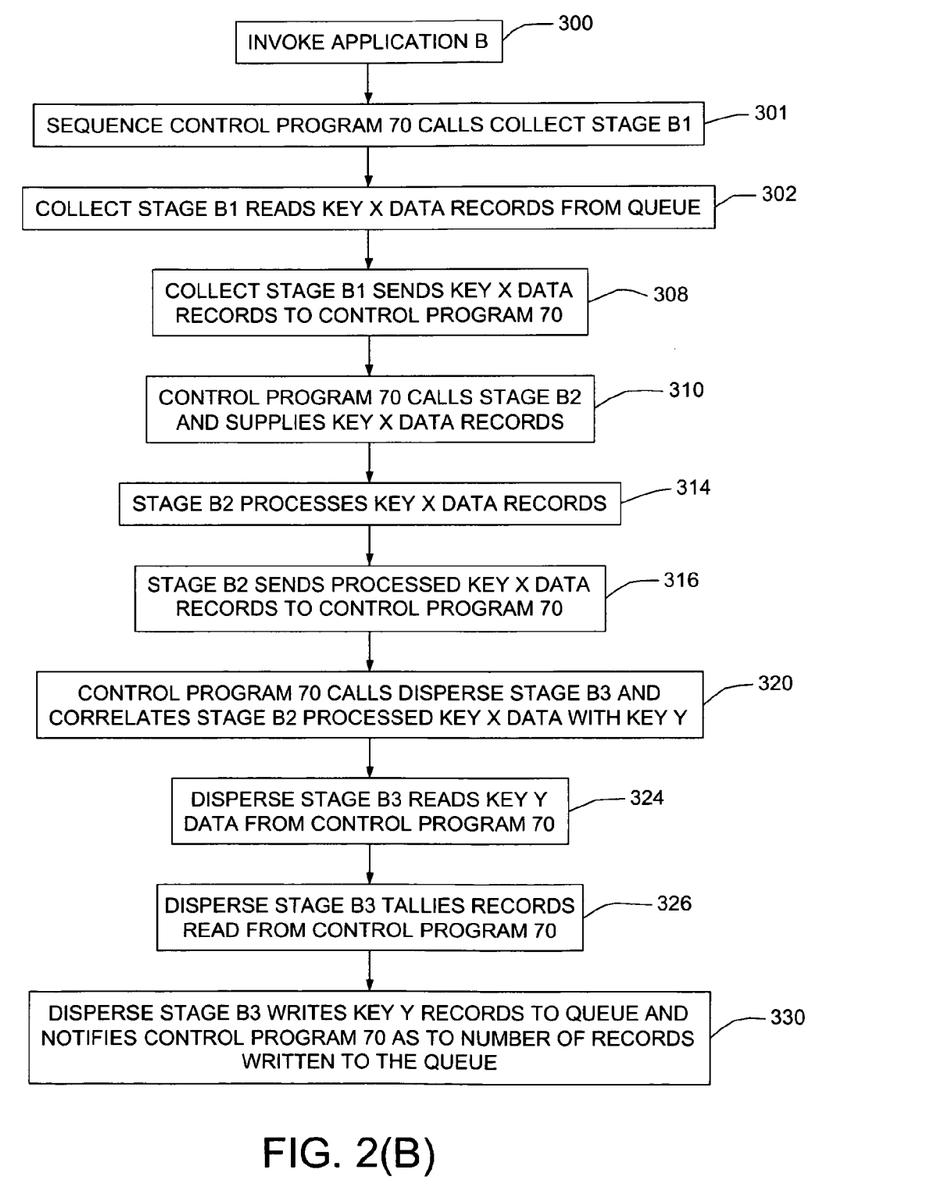
FIG. 2(B) is a flow chart illustrating in more detail the other Piping application in the other computer of FIG. 1.

FIG. 2(B) illustrates processing by Piping Application B, including sequence control program 70 and Stages B1-B3 based on piping command 71. Piping Application B exchanges data with Piping Application A as described in FIG. 2(A), even though each application is unaware of the other application. The developer of Application B previously provided and combined Stages B1-B3 with sequence control program 70 and previously issued the following piping command to sequence control program 70 to form Application B:

"Collect(Queue 30, Key X, T2 Seconds)|Stage B2|Disperse(Queue 30, Key X)"

In step 300, Application B is invoked and in response, control program 70 calls its first stage, Stage B1 (step 301). In the illustrated example, Stage B1 is collect Stage 74, and is called with the following command:

"Collect(Queue 30, Key X, T2)"

In response, collect Stage 74 attempts to read data with Key X from queue 30 until all records have been read or a time-out T2 is reached (step 302). The data with Key X was previously supplied or will be supplied by Application A in step 2_. Assuming there is data in queue 30 identified by Key X via disperse stage A1 62, the collect Stage B1 74 fetches the data identified by Key X from queue 30 up until the number of first stage records supplied by disperse stage 63 of Application A (or until time-out T2 is reached) (step 302) Then, collect Stage B1 74 supplies the first stage records to sequence control program 70 (step 308). Next, control program 70 continues its processing of Application B by invoking the next stage B2 of Application B (step 310) with the following call:

"Stage B2" (with parameters when needed)

When invoking Stage B2, control program 70 also supplies to Stage B2 the data with Key X from queue 30 supplied by disperse Stage A2 63 and fetched by collect Stage B1 74. Stage B2 processes the data with Key X from queue 30 (step 314), and sends its results to control program 70 (step 316).

Control program 70 continues its processing of Application B by invoking the next stage, Stage B3 of Application B (step 320). In the illustrated example, Stage B3, is disperse Stage 73, and control program 70 invokes disperse Stage 73 with the following command:

"Disperse (Queue 30, Key Y)"

Control program 70 also correlates the data output from Stage B2 with Key Y (step 320). In response to invocation of disperse Stage B3, disperse Stage B3 reads from control program 70 the data with Key Y (step 324) and also tallies the number of data records with Key Y read from control program 70 (step 326). Next, disperse Stage B3 writes the records with Key Y onto queue 30 and also supplies the tally from step 326 to the control program 70 (step 330). These records with Key Y then become available to Application A via collect Stage A3 64, as noted above. If there are any other stages in Application B, then control program 70 invokes them in sequence.

Thus, the developers of Applications A and B can easily define Application A and Application B using a piping construct, and allow Applications A and Application B to exchange data in one or both directions without the developer having to synchronize the movement of data within either Application A or Application B or the exchange of data between Application A and Application B. Also, the data can be exchanged across different real computers (as illustrated) without the developer of Application A or Application B having to synchronize the transfer of the data across real computers. (If desired, both Applications A and B, and queue 30 could reside in the same real computer, such as computer 12.)

In addition, Application A is "distinct" from the Application B in that the piping command that defined the sequence of stages in Application A, and Application A itself, did not mention Application B, and the piping command that defined the sequence of stages in Application B, and Application B itself, did not mention Application A. Application A does not control what other Application or Applications read and process the data with Key X sent by Application A to queue 30, and Application A does not control what other Application or Applications furnish the data with Key Y to queue 30 that Application A subsequently receives and processes. Likewise, Application B does not control what other Application or Applications read and process the data with Key Y sent by Application B to queue 30, and Application B does not control what other Application or Applications furnish the data with Key X to queue 30 that Application B subsequently receives and processes.

Figure 3:
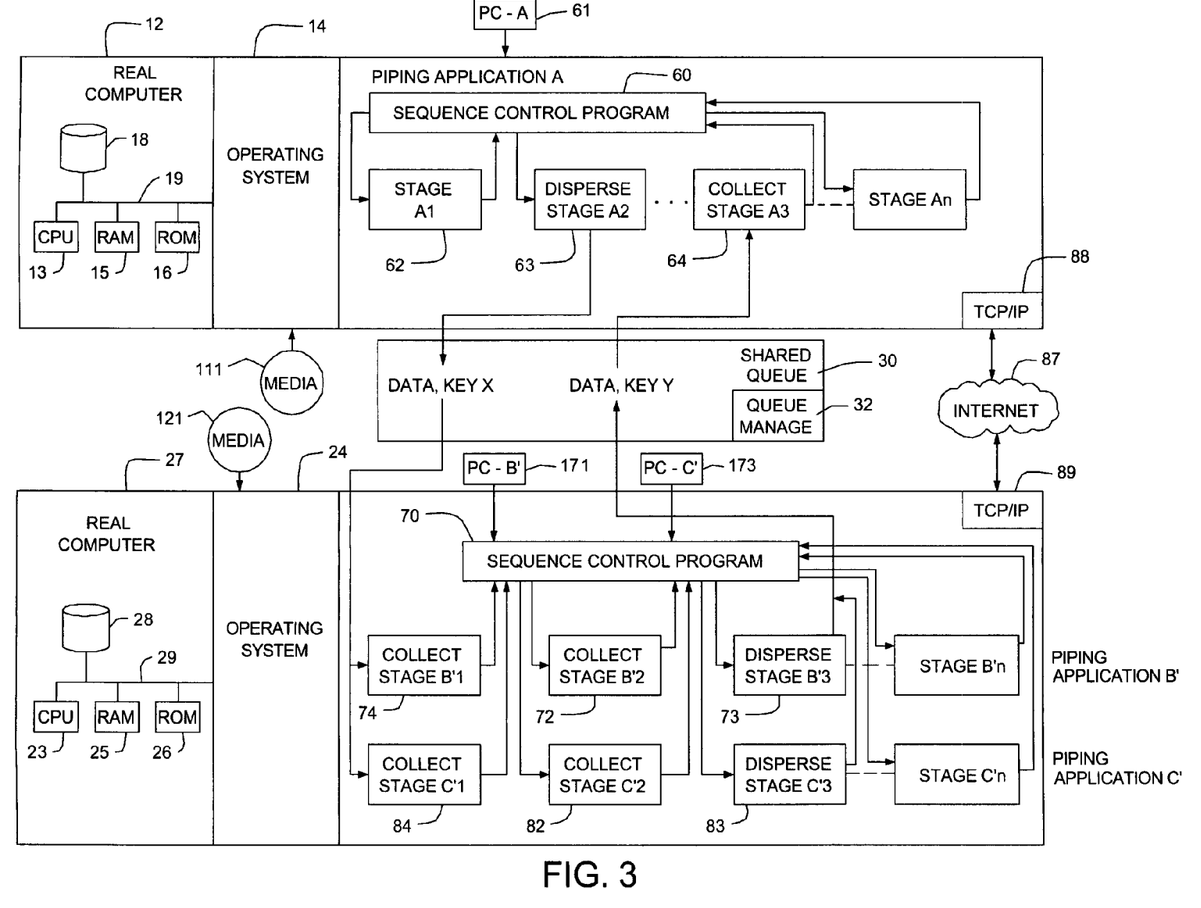
FIG. 3 is a block diagram of a distributed computer system which includes one Piping Application based on one sequence control program and stages in one computer and two other Piping Applications, which execute in a parallel, load balancing arrangement, based on another sequence control program and other stages in another computer, according to the present invention.

FIG. 3 illustrates another example of usage of sequence control program or interpreter 60 and Stages A1-A4, An . . . and piping command 61 to form Piping Application A. Application A in FIG. 3 is the same as Application A in FIG. 1 described above. FIG. 3 also illustrates another example of usage of sequence control program 70 and Stages B'1-3, Bn and C1-3, Cn to form Piping Application B' and Piping Application C', respectively. Applications B' and C' process in parallel (the same as processing by Application B alone in FIG. 1) the data with Key X supplied by Application A to queue 30. Applications B' and C' supply resultant data with Key Y to queue 30 (the same as returned by Application B alone in FIG. 1). Application B' is the same as Application B except as follows, and Application C' is the same as Application B'. In the example of FIG. 3, Applications B' and C' are programmed, based on a parameter in control program 70, to read different units of the data with Key X from queue 30 during execution of their respective collect Stages B'1 and C'1, as follows. Each of the collect Stages B1' and C1' is programmed to read only a finite number of records during each iteration of Stages B1' and C1' as specified in control program 70 so that the data with Key X supplied by Application A is split, processed and load balanced between Applications B' and C'. (In other words, data records read by collect stage B'1 are not available to be read by collect stage C'1, and vice versa, so the same data records with Key X are not read or processed by both Applications B' and C'.) Thus, Applications B and C process in parallel the data with Key X supplied by Application A to queue 30, and furnish to queue 30 the resultant data with Key Y. The data output from both Applications B' and C' is sent to queue 30 under the same Key Y and is combined in queue 30 and available to Application A. Thus, Application A collects the data with Key Y from both Applications B' and C'. The developer of Application B' previously provided and combined Stages B'1-B'3 with sequence control program 70, and previously defined Application B' with the following command to sequence control program 70:

"Collect(Queue 30, Key X, T2)|Stage B'2|Disperse(Queue 30, Key X)"

The developer of Application C' previously provided and combined Stages C'1-C'3 with sequence control program 70, and previously defined Application C' with the following command to sequence control program 70:

"Collect(Queue 30, Key X, T2)|Stage C'2|Disperse(Queue 30, Key X)"

In the illustrated example, both Applications B' and C' utilize the same instance of sequence control program 70, and sequence control program 70 is an interpreter. (However, if desired, there could be separate instances of sequence control program 70 for Applications B' and C'.)

Application A is "distinct" from the Applications B' and C' in that the command that defined the sequence of stages of Application A, and Application A itself, did not mention Applications B' or C' and the commands that defined the sequence of stages of Applications B' and C' did not mention Application A. Application A does not control what other Application or Applications read and process the data with Key X sent by Application A to queue 30, and Application A does not control what other Application or Applications furnish the data with Key Y to queue 30 that Application A subsequently receives and processes. Likewise, Applications B' and C' do not control what other Application or Applications read and process the data with Key Y sent by Applications B' and C' to queue 30, and Applications B' and C' do not control what other Application or Applications furnish the data with Key X to queue 30 that Applications B' and C' subsequently receive and process in parallel.

Figure 4:
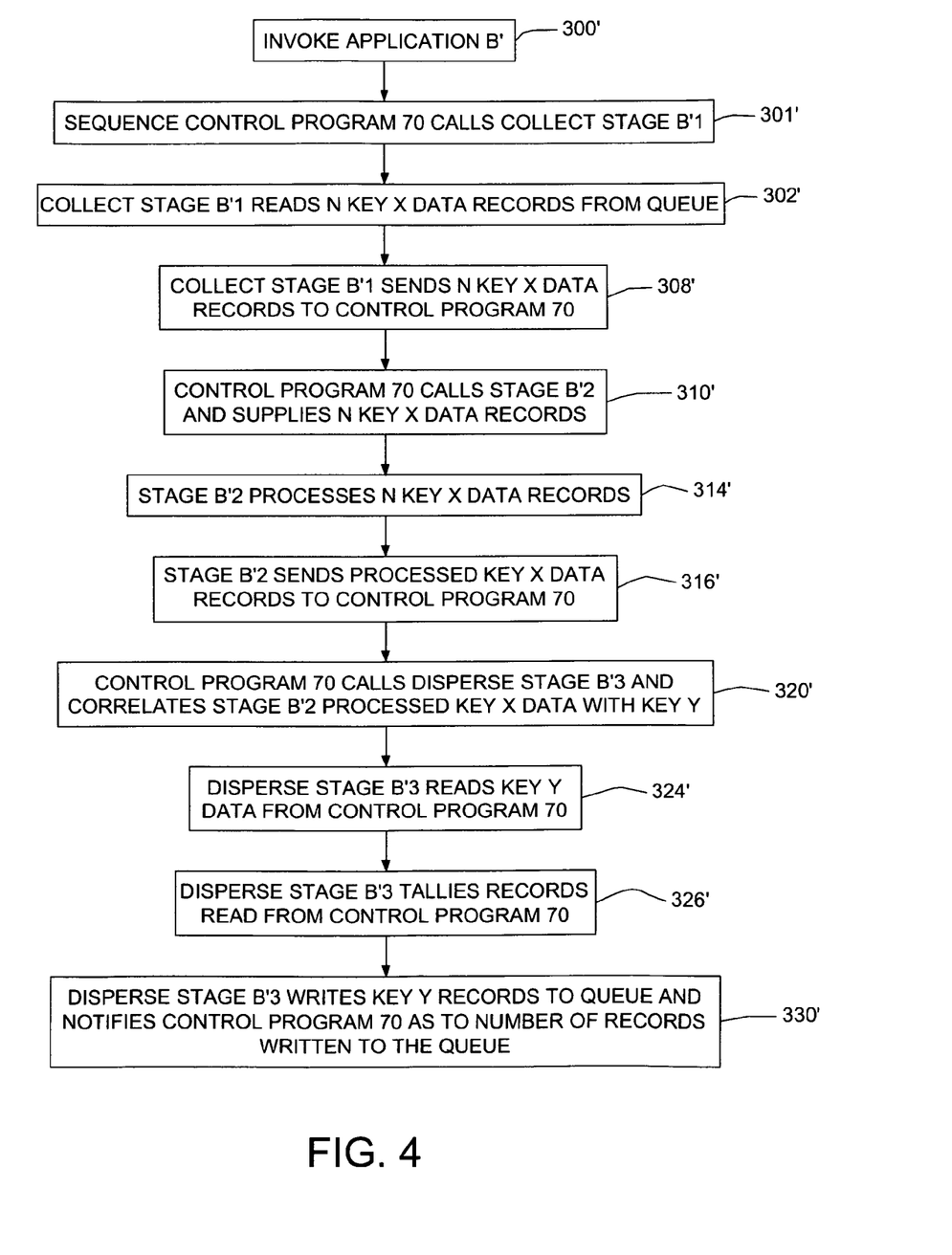
FIG. 4 is a flow chart illustrating in more detail one of the other Piping applications in the other computer of FIG. 3.
Figure 5:
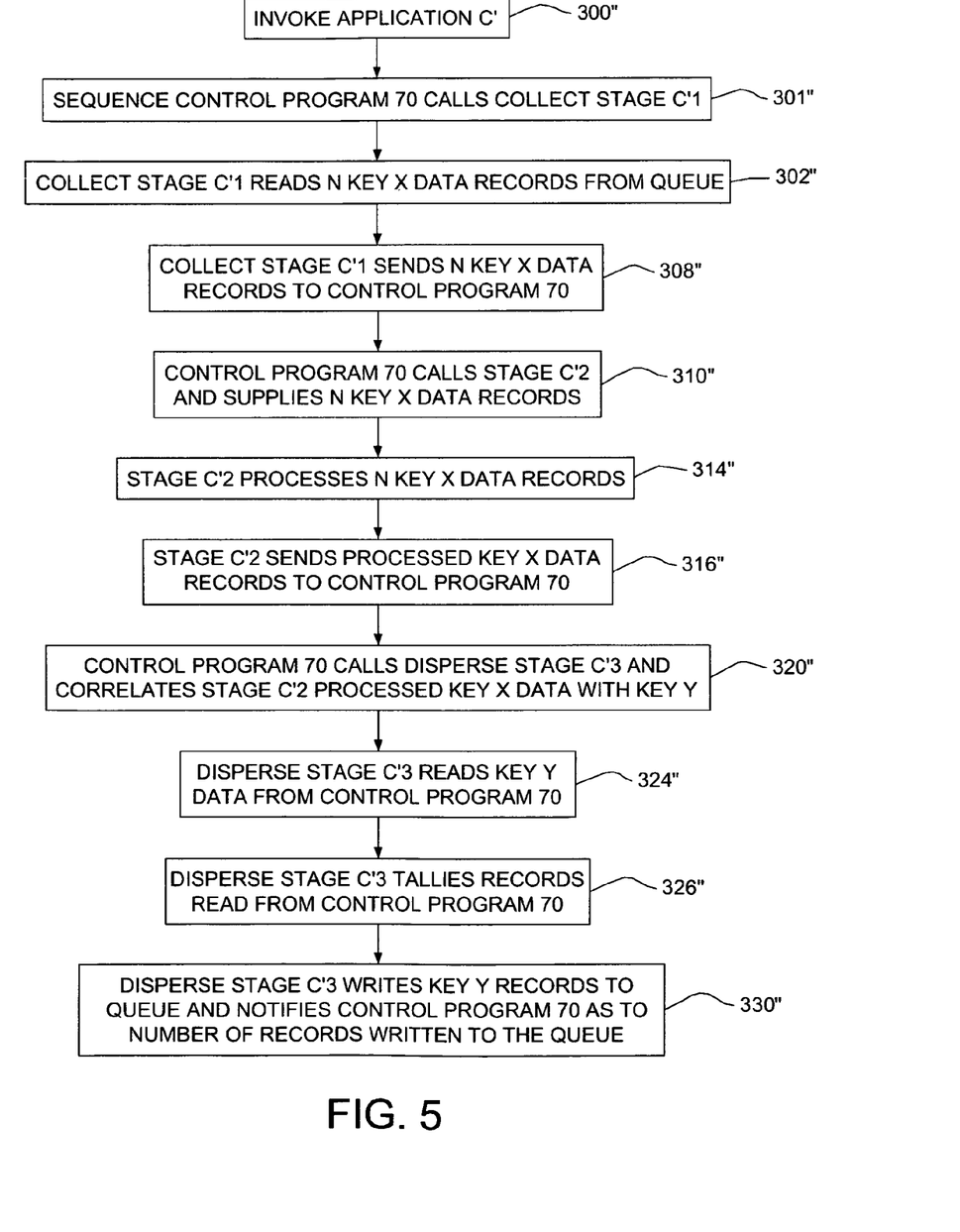
FIG. 5 is a flow chart illustrating in more detail the other of the other Piping applications in the other computer of FIG. 3.

FIG. 4 illustrates Application B' in more detail, and FIG. 5 illustrates Application C' in more detail. The steps of Application C' indicated by a """ at the end of the reference number in FIG. 5 are the same as the corresponding steps of Application B indicated by a "" at the end of the reference number in FIG. 4. The steps of Application B' indicated by a "" at the end of the reference number in FIG. 3(B) are the same as the corresponding steps of Application B which omit the """ at the end of the reference number in FIG. 4, except as follows. In step 302' of FIG. 4, Application B' only reads N Key X records from queue 30 in each iteration of step 302', not all the Key X records available from queue 30. Likewise, in step 302" of FIG. 5, Application C' only reads N Key X records from queue 30 in each iteration of step 302", not all the Key X records available from queue 30. This allows both Applications B' and C' to process different Key X data in queue 30 in parallel, in a load balancing arrangement. In subsequent step 308' and 308" of FIGS. 4 and 5, only the N Key X records are sent to the control program 70, and in subsequent steps 310' and 310" of FIGS. 4 and 5 only the N Key X records are processed by the next stage B'2 and C'2 during each iteration of Applications A and B.

Figure 6:
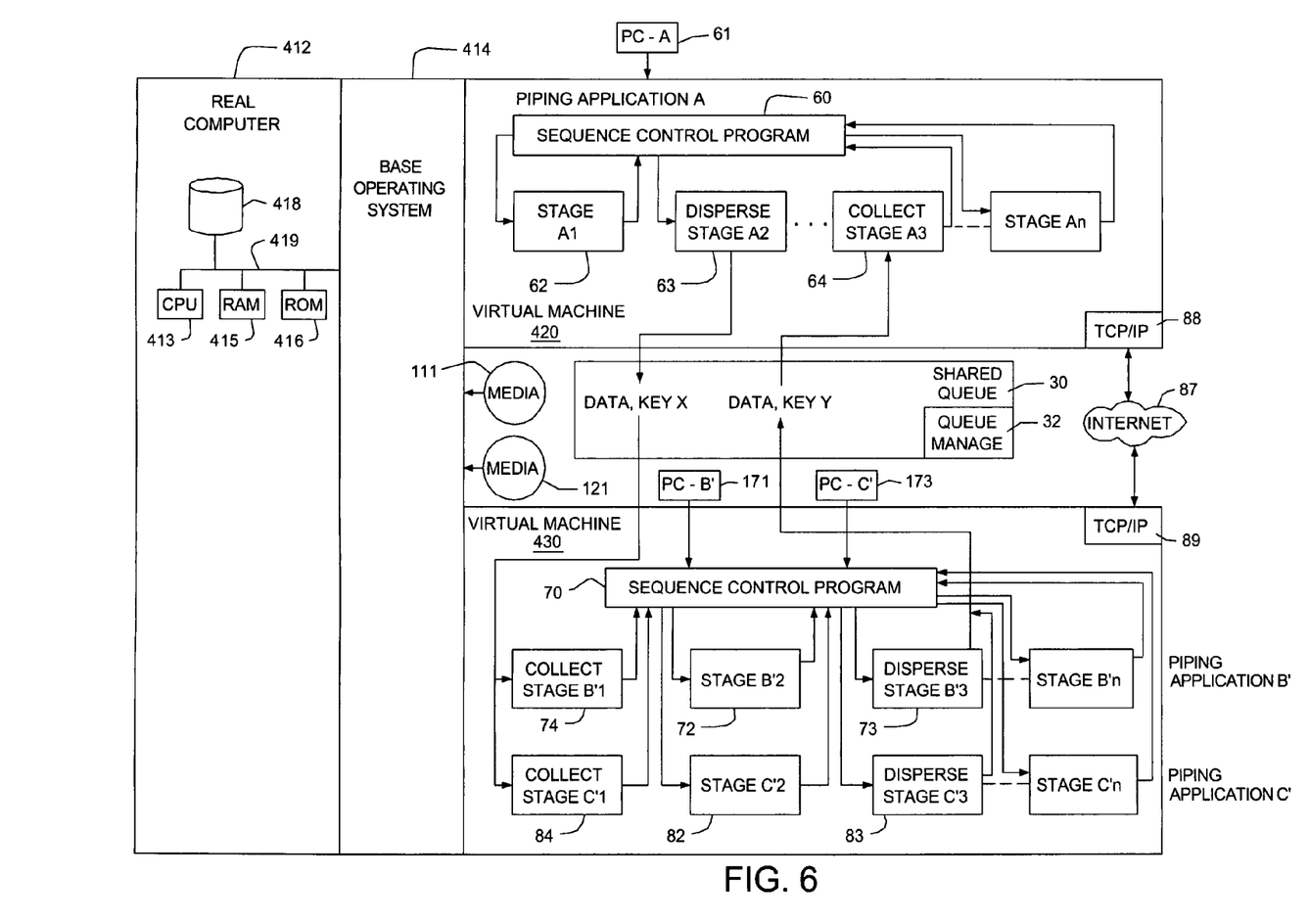
FIG. 6 illustrates another embodiment of the present invention where a single real computer with a processor, RAM, ROM on a bus and storage is divided into virtual machines by a base operating system.

FIG. 6 illustrates another embodiment of the present invention where a single real computer 412 with a processor 413, RAM 414, ROM 415 on a bus 419 and storage 418 are divided into virtual machines 420 and 430 by a base operating system 414. Piping Application A executes in virtual machine 420, and Piping Applications B' and C' execute in virtual machine 430. Piping Applications A, B' and C' are the same as described above with reference to FIGS. 1, 2(A), 3, 4 and 5.

Sequence control program 60 can be loaded into computer 12 from a computer readable media 111, such as magnetic tape or disk, optical media, DVD, memory stick, semiconductor memory, etc. or downloaded from the Internet 87 via TCP/IP adapter card 88.

Program stages A1-A4 . . . An can be loaded into computer 12 from a computer readable media 111, such as magnetic tape or disk, optical media, DVD, memory stick, semiconductor memory, etc. or downloaded from the Internet 87 via TCP/IP adapter card 88.

Sequence control program 70 can be loaded into computer 22 from a computer readable media 121, such as magnetic tape or disk, optical media, DVD, memory stick, semiconductor memory, etc. or downloaded from the Internet 87 via TCP/IP adapter card 89.

Program stages B1-B3 . . . Bn, B'1-B'3 . . . B'n and C'1-C'3 . . . C'n can be loaded into computer 12 from a computer readable media 121, such as magnetic tape or disk, optical media, DVD, memory stick, semiconductor memory, etc. or downloaded from the Internet 87 via TCP/IP adapter card 88.

Based on the foregoing, a system, method and program product for sequencing processing of data by different programs have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed:

1. A method, executed by at least one central processing unit (CPU), for processing data by first, second and third piping applications, said method comprising the steps of:
    defining said first piping application by combining first and second stages of programming with a first sequence control program and specifying to said first sequence control program a first piping command, said second stage being a function to send data to a shared queue, said first piping command identifying said first stage, said second stage and parameters for said second stage identifying said shared queue and a key for said data to be sent to said shared queue;
    defining said second piping application by combining third and fourth stages of programming with a second sequence control program, and specifying to said second sequence control program a second piping command, said third stage being a function to read said data from said shared queue, said second piping command identifying said fourth stage, said third stage, and parameters for said third stage identifying said shared queue and said key for said data to be read from said shared queue;
    defining said third piping application by combining fifth and sixth stages of programming with said second sequence control program, and specifying to said second sequence control program a third piping command, said fifth stage being a function to read said data from said shared queue, said third piping command identifying said sixth stage, said fifth stage and parameters for said fifth stage identifying said shared queue and said key for said data to be read from said shared queue; and
    executing said first, second and third piping applications based on their respective definitions, stages and sequence control programs; and wherein
said first piping command does not identify said second or third piping applications, said second piping command does not identify said first or third piping applications, and said third piping command does not identify said first or second piping applications.

2. A method as set forth in claim 1 wherein the executing step comprises the steps of:
    said first stage receiving and processing data from said first sequence control program and sending resultant, first stage output data to said first sequence control program;
    said second stage receiving said first stage output data from said first sequence control program and sending said first stage output data to said shared queue with said key;
    said third stage receiving and processing from said shared queue some of said first stage output data sent by said second stage to said shared queue and sending resultant, third stage output data to said second sequence control program;
    said fourth stage receiving and processing said third stage output data from said second sequence control program and sending resultant, fourth stage output data to said second sequence control program;
    said fifth stage receiving and processing from said shared queue other of said first stage output data sent by said second stage to said shared queue and sending resultant, fifth stage output data to said second sequence control program; and
    said sixth stage receiving and processing said fifth stage output data from said second sequence control program and sending resultant, sixth stage output data to said second control program.

3. A method as set forth in claim 1 wherein:
    said first piping application does not identify said second piping application or said third piping application;
    said second piping application does not identify said first piping application or said third piping application; and
    said third piping application does not identify said first piping application or said second piping application.

4. A method as set forth in claim 1 wherein:
    said first piping application executes in a first real computer; and
    said second and third piping applications execute in a second real computer.

5. A system including at least one central processing unit (CPU) for processing data by first, second and third piping applications, said system comprising:
    means for defining said first piping application by combining first and second stages of programming with a first sequence control program based on a first piping command supplied to said first sequence control program, said second stage being a function to send data to a shared shared queue, said first piping command identifying said first stage, said second stage and parameters for said second stage identifying said shared queue and a key for said data to be sent to said shared queue;
    means for defining said second piping application by combining third and fourth stages of programming with a second sequence control program based on a second piping command supplied to said second sequence control program, said third stage being a function to read said data from said shared queue, said second piping command identifying said fourth stage, said third stage, and parameters for said third stage identifying said shared queue and said key for said data to be read from said shared queue;
    means for defining said third piping application by combining fifth and sixth stages of programming with said second sequence control program based on a third piping command supplied to said second sequence control program, said fifth stage being a function to read said data from said shared queue, said third piping command identifying said sixth stage, said fifth stage and parameters for said fifth stage identifying said shared queue and said key for said data to be read from said shared queue; and
    means for executing said first, second and third piping applications based on their respective definitions, stages and sequence control programs; and wherein
said first piping command does not identify said second or third piping applications, said second piping command does not identify said first or third piping applications, and said third piping command does not identify said first or second piping applications.

6. A system as set forth in claim 5 wherein the means for executing comprises:
    means within said first stage for receiving and processing data from said first sequence control program and sending resultant, first stage output data to said first sequence control program;

means within said second stage for receiving said first stage output data from said first sequence control program and sending said first stage output data to said shared queue with said key;

means within said third stage for receiving and processing from said shared queue some of said first stage output data sent by said second stage to said shared queue and sending resultant, third stage output data to said second sequence control program;

means within said fourth stage for receiving and processing said third stage output data from said second sequence control program and sending resultant, fourth stage output data to said second sequence control program;

means within said fifth stage for receiving and processing from said shared queue other of said first stage output data sent by said second stage to said shared queue and sending resultant, fifth stage output data to said second sequence control program; and means within said sixth stage for receiving and processing said fifth stage output data from said second sequence control program and sending resultant, sixth stage output data to said second control program.

7. A system as set forth in claim 5 wherein:
said first piping application does not identify said second piping application or said third piping application;
said second piping application does not identify said first piping application or said third piping application; and
said third piping application does not identify said first piping application or said second piping application.

8. A system as set forth in claim 5 wherein:
said first piping application executes in a first real computer; and
said second and third piping applications execute in a second real computer.

9. A computer program product stored in one or more non-transitory computer readable media for processing data by first, second and third piping applications, said computer program product comprising:
computer readable media;
first program instructions to define said first piping application by combining first and second stages of programming with a first sequence control program based on a first piping command supplied to said first sequence control program, said second stage being a function to send data to a shared queue, said first piping command identifying said first stage, said second stage and parameters for said second stage identifying said shared queue and a key for said data to be sent to said shared queue;
second program instructions to define said second piping application by combining third and fourth stages of programming with a second sequence control program based on a second piping command supplied to said second sequence control program, said third stage being a function to read said data from said shared queue, said second piping command identifying said fourth stage, said third stage, and parameters for said third stage identifying said shared queue and said key for said data to be read from said shared queue;
third program instructions to define said third piping application by combining fifth and sixth stages of programming with said second sequence control program based on a third piping command supplied to said second sequence control program, said fifth stage being a function to read said data from said shared queue, said third piping command identifying said sixth stage, said fifth stage and parameters for said fifth stage identifying said shared queue and said key for said data to be read from said shared queue; and fourth program instructions to initiate execution of said first, second and third piping applications based on their respective definitions, stages and sequence control programs; and wherein
said first piping command does not identify said second or third piping applications, said second piping command does not identify said first or third piping applications, and said third piping command does not identify said first or second piping applications; and
said first, second, third and fourth program instructions are stored on said computer readable media in functional form.

10. A computer program product as set forth in claim 9 wherein the fourth program instructions comprise:
fifth program instructions for execution within said first stage to receive and process data from said first sequence control program and initiate sending of resultant, first stage output data to said first sequence control program;
sixth program instructions for execution within said second stage to receive said first stage output data from said first sequence control program and initiate sending of said first stage output data to said shared queue with said key;
seventh program instructions for execution within said third stage to receive and process from said shared queue some of said first stage output data sent by said second stage to said shared queue and initiate sending of resultant, third stage output data to said second sequence control program;
eighth program instructions for execution within said fourth stage to receive and process said third stage output data from said second sequence control program and initiate sending of resultant, fourth stage output data to said second sequence control program;
ninth program instructions for execution within said fifth stage to receive and process from said shared queue other of said first stage output data sent by said second stage to said shared queue and initiate sending of resultant, fifth stage output data to said second sequence control program; and
tenth program instructions for execution within said sixth stage to receive and process said fifth stage output data from said second sequence control program and initiate sending of resultant, sixth stage output data to said second control program; and wherein
said fifth, sixth, seventh, eighth, ninth and tenth program instructions are stored on said media in functional form.

11. A computer program product as set forth in claim 9 wherein:
said first piping application does not identify said second piping application or said third piping application;
said second piping application does not identify said first piping application or said third piping application; and
said third piping application does not identify said first piping application or said second piping application.

12. A computer program product as set forth in claim 9 wherein:
said first piping application executes in a first real computer; and
said second and third piping applications execute in a second real computer.

* * * * *